United States Patent
Persegol et al.

(12)

(10) Patent No.: US 6,204,915 B1
(45) Date of Patent: Mar. 20, 2001

(54) MEASURING PROBE COMPRISING AT LEAST ONE OPTIC FIBER, AND A MEASURING DEVICE AND INSTALLATION COMPRISING AT LEAST ONE SUCH PROBE

(75) Inventors: Dominique Persegol, Grenoble; Vincent Minier; Jean-Louis Lovato, both of Meylan; Christian Petit, Vif; Pierre Amblard, Meylan; Alain Hermil-Boudin, Saint Ismier, all of (FR)

(73) Assignee: Schneider Electric SA (FR)

( * ) Notice: Subject to any disclaimer, the term of this patent is extended or adjusted under 35 U.S.C. 154(b) by 0 days.

(21) Appl. No.: 09/251,422

(22) Filed: Feb. 17, 1999

(30) Foreign Application Priority Data

Mar. 6, 1998 (FR) .................................................. 98 03001

(51) Int. Cl.[7] .................................................. G01N 21/00
(52) U.S. Cl. .............................................. 356/73.1; 385/25
(58) Field of Search .............................. 356/73.1; 385/88, 385/89, 90, 91, 94, 101, 102, 25, 26, 53–56, 62; 359/159

(56) References Cited

U.S. PATENT DOCUMENTS 5,107,445   4/1992   Jensen et al. .

FOREIGN PATENT DOCUMENTS

| 9308117 | 10/1993 | (DE) . |
| 29500373 U | 4/1995 | (DE) . |
| 63-212910 | * 9/1988 | (JP) . |
| 63-253910 | * 9/1988 | (JP) . |

* cited by examiner

*Primary Examiner*—Frank G. Font
*Assistant Examiner*—Tu T. Nguyen
(74) *Attorney, Agent, or Firm*—Parkhurst & Wendel, L.L.P

(57) ABSTRACT

The probe comprises at least one optic fiber and an electronic circuit comprising a securing device for securing the optic fiber in optic connection with signal conversion means. The electronic circuit comprises a removable electrical connector connected to the signal conversion means such as a light-emitting diode and/or photo-detector to supply or receive electronic signals used by a processing circuit. A measuring device comprises at least one optic fiber probe connected by means of the removable connector to a processing circuit. Application in particular to temperature measurement probes and devices which comprise optic fibers and to installations comprising electrical conductors.

20 Claims, 6 Drawing Sheets

MEASURING PROBE COMPRISING AT LEAST ONE OPTIC FIBER, AND A MEASURING DEVICE AND INSTALLATION COMPRISING AT LEAST ONE SUCH PROBE

BACKGROUND OF THE INVENTION

The invention relates to a measuring probe comprising at least one optic fiber, a device comprising such a probe and signal processing means, and an installation comprising at least one electrical conductor and such a probe.

Known optic fiber measuring probes generally comprise at least one optic fiber a first end of which is connected to a sensor and a second end of which is connected to an electronic processing device. To connect the fibers to the processing device, it is known to use removable optic connectors designed to cooperate with fixed optic or optoelectronic elements connected to the processing circuit.

Optic connectors require a strict alignment with other fibers or with optoelectronic elements to obtain maximum coupling of the power of the light signals flowing in the fibers. In addition, optic connectors are costly and bulky and consequently hardly compatible with installations which require several measuring points. In particular, when optic fiber probes are used in an industrial environment, the optic connectors are liable to be subjected to stresses which may damage the optic links when the latter are fitted or handled.

In industrial installations, fitting and replacement of probes must be able to be performed by personnel knowing said installations. This personnel is not always specialized in connection of optic fibers or is not always equipped with the tools to perform this on the installation site. Known optic fiber probes are thus not always easy to use in industrial installations without having recourse to specific technical means and strict assembly precautions on the premises of said installations.

SUMMARY OF THE INVENTION

The object of the invention is to achieve an optic fiber probe able to be easily installed, and a measuring device and installation comprising such a probe.

An optic fiber measurement probe according to the invention comprises:
- at least one optic fiber,
- at least one electronic circuit comprising having first electrical connection means,
- at least one temperature sensor arranged at one end of at least one optic fiber,
- signal conversion means connected to the first connection means and designed to provide an interface between light signals conveyed by at least one optic fiber arranged with the temperature sensor and electronic signals designed to flow in said first connection means, and
- optic fiber securing means to keep said at least one optic fiber, arranged with the temperature sensor, in optic connection with said conversion means.

In a preferred embodiment, the probe comprises amplifier means connected between signal conversion means and the first connection means.

The probe comprises a sensor arranged on said at least one optic fiber and reacting to light signals, light signals originating from said sensor being representative of a physical quantity to be measured.

Advantageously, the probe comprises storage means to store calibration or setting parameters in memory.

Preferably, the signal conversion means comprise at least one photo-detector converting light signals supplied at one end of an optic fiber into electronic signals.

Preferably, the signal conversion means comprise at least one optic transmitter to convert electronic signals originating from the first electrical connection means into light signals input at one end of an optic fiber maintained in optic connection with said optic transmitter.

According to a particular embodiment, the probe comprises a temperature sensor arranged at one end of at least one optic fiber and comprising a light-emitting material, a first light signal being sent from conversion means to excite said light-emitting material and a second light signal being transmitted by said material and conveyed via said optic fiber to the signal conversion means, said second light signal having a different wavelength from the wavelength of the first light signal and a decrease representative of a temperature.

Preferably, the probe comprises a first and a second optic fibers arranged between the sensor and the signal conversion means, the first optic fiber conducting the first light signal and the second optic fiber conducting the second light signal.

For example, the probe can comprise an optic separation system arranged between the optic fiber and the signal conversion means. To filter light signals, the probe can comprise an optic filter arranged between one end of an optic fiber and the signal conversion means.

Preferably, at least one optic fiber is an optic fiber made of plastic material.

Advantageously, the optic fiber securing means comprise a positioning part for positioning an optic fiber on the signal conversion means.

Preferably, the optic fiber securing means comprise a guiding element.

According to a preferred embodiment, the conversion means comprise at least one light-emitting diode, a photo-detector and fixing means to secure a first optic fiber in optic connection with said light-emitting diode and a second optic fiber in optic connection with said photo-detector.

To integrate three measuring channels, the probe comprises fixing means to secure three first optic fibers in optic connection with three light-emitting diodes and three second optic fibers in optic connection with three photo-detectors.

For the purposes of reducing the volume of the probe, the light-emitting diodes and the first connection means are arranged on a first printed circuit and the photo-detectors are arranged on a second printed circuit, the second printed circuit being electrically connected to the first printed circuit and positioned appreciably orthogonally.

In order to protect electronic or optoelectronic components, the probe can comprise a first insulating coating covering at least a part of the electronic circuit and a second conducting coating covering at least a part of the first coating.

In a preferred application, the probe is used for measuring the temperature of at least one electrical conductor.

A measuring device with optic fiber according to the invention comprises signal processing means, a probe as defined above, and second connection means connected to said processing means and designed to cooperate with the first connection means.

An installation according to the invention comprises at least one electrical conductor, and at least one probe as defined above connected to said electrical conductor.

BRIEF DESCRIPTION OF THE DRAWINGS

Other antages and features will become more clearly apparent from the following description of particular embodiments of the invention given as non-restrictive examples only and represented in the accompanying drawings in which.

DETAILED DESCRIPTION OF THE PREFERRED EMBODIMENT

Figure 1:
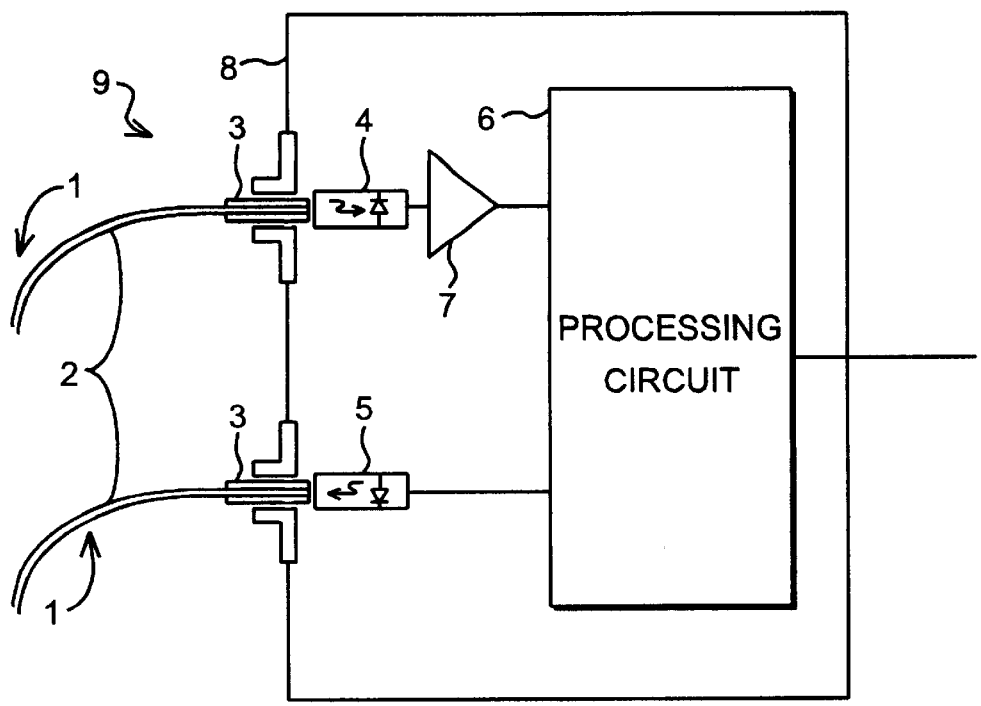
FIG. 1 shows a wiring diagram of optic fiber probes of known type.

In the known embodiment of FIG. 1, the optic fiber sensors 1 comprise optic fibers 2 associated to optic connectors 3. These optic connectors are removable, and cooperate with optoelectronic devices 4 and 5 connected to a processing circuit 6 of a measurement centralizing device 8. The optoelectronic devices can comprise in particular a photo-detector 4 to receive light signals or a light-emitting diode 5 to emit light signals. Preferably, an amplifier 7 is connected between the photo-detector 4 and the processing circuit 6 to amplify electronic signals representative of light signals.

In certain cases, intermediate fibers can be used between the optic connectors and the optoelectronic devices.

When the sensors are used in industrial installations comprising measuring devices 8, optic connection of the connectors 3 may not be perfectly achieved. Specific tooling is in fact sometimes needed and qualified personnel required to adjust the optic alignment of the connectors 3 with the optoelectronic devices 4 and 5. In addition, if this optic coupling is not of good quality, the optic losses are too great and the measurements made by the sensors are liable to be wrong.

Another drawback of the use of fibers with optic connectors involves the risk of deterioration of said connectors. These sensors can in fact be subjected to all sorts of mechanical or atmospheric stresses which can modify the characteristics of the optic coupling. For example, the optic connectors may be dirtied, partially blocked or be covered with humidity or dust.

In a sensor according to one embodiment of the invention, the sensor comprises an electronic circuit on which an optic fiber is kept in optic connection with a signal conversion optoelectronic device connected to an electrical connector. A final user in this case receives a sensor whose optic link part is already assembled. This user, specialized in particular in electrical installations, will then simply have to connect the sensor electrically without having to bother about the optic part. The optic link being achieved in optimum manner and hermetically protected, external stresses do not have any effect and the measurements made by the sensor are not adversely affected.

Figure 2:
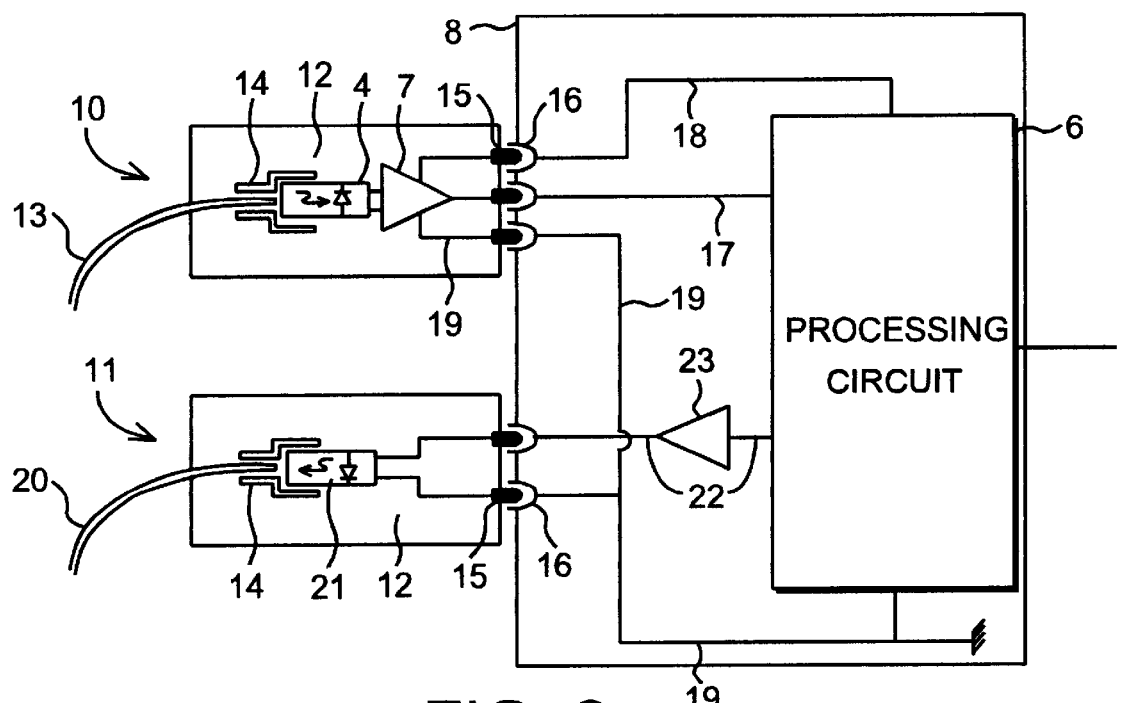
FIG. 2 shows a first diagram of optic fiber probes and devices according to a first embodiment of the invention.

FIG. 2 shows a measuring device with two optic fiber sensors 10 and 11 according to a first embodiment of the invention. A first sensor 10 comprises an electronic circuit 12 such as a printed circuit on which a photo-detector 4 is optically linked to an optic fiber 13 secured and protected by a maintaining device 14. The circuit 12 comprises a removable electrical connector 15 designed to cooperate with a fixed electrical connector 16 disposed on the device 8. The electrical circuit can also comprise an amplifier 7 connected between the photo-detector 4 and the connector 16. The connectors 15 and 16 also convey, in this embodiment, an electronic measurement signal 17, a reference line 19 and a power supply line 18.

A second sensor 11 comprises an electronic circuit 12 such as a printed circuit or a hardwired circuit on which an optic fiber 20 is optically linked to a light-emitting diode 21, said diode 21 being secured and protected by a maintaining device 14. The light-emitting diode 21 is connected to the removable connector 15 located on the circuit 12, said connector 15 being designed to cooperate with a fixed connector 16 arranged on the device 8. In this figure the connectors 15 and 16 have a connection point to send an electronic signal 22 to the diode 21 and a point for the reference line 19. The signal 22 supplied by the processing circuit 6 can be amplified by an amplifier circuit 23.

In a preferred embodiment, all the connection points of the connectors 15 can be grouped together on a single connector, and the fibers 13 to 20 can cooperate in a single measurement and be secured on a single circuit 12.

Figure 3:
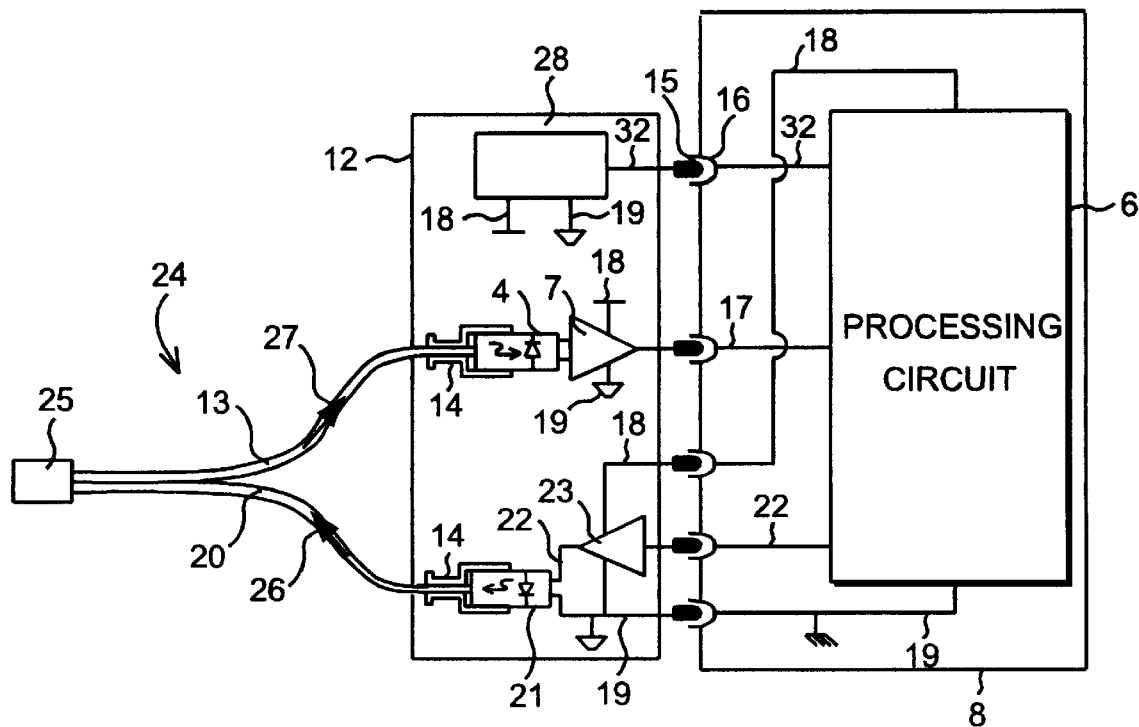
FIG. 3 shows a second diagram of optic fiber probes and devices according to a second embodiment of the invention.

FIG. 3 shows the diagram of a measuring device and a sensor 24 comprising two optic fibers 13 and 20 associated to a sensor 25. The two optic fibers are secured via one end on a circuit 12 in optic connection with signal conversion devices 4 and 21, the other end of each fiber being associated to the sensor 25.

A first fiber 20 is secured on a circuit 12 in optic connection with the light-emitting diode 21 via one end, the other end being associated to the sensor 25. A second optic fiber 13 is secured to the circuit 12 in optic connection with the photo-detector 4 via one end, the other end also being associated to the sensor 25. In this diagram, the photo-detector 4 is a phototransistor connected to the input of an amplifier 7 whose output is connected to a removable connector 15. The diode 21 is connected via an amplifier circuit 23 to the connector 15. The connector 15 is able to be associated to a fixed connector 16 of the device 8.

The processing circuit is connected to the fixed connector 16. It sends control signals 22 to the diode 21 and receives measurement signals 17 from the photo-detector 4 in return. The control signals 22 are converted by the light-emitting diode 21 into a first light signal 26 flowing in the first optic fiber 20 to excite the sensor 25. Then a second light signal 27 emitted by the sensor 25 flows in the second optic fiber 13 to be detected by the photo-detector 4 which converts the second light signal into an electronic signal 17. This signal is amplified by the amplifier 7 and supplied to the processing circuit 6 via the electrical connectors 15 and 16.

The optic links being adjusted in optimum manner and the fibers then being fixed and secured, the measurements made by the sensors are sure and reliable. Moreover, the sensors can easily be fitted or replaced by simple electrical connections of the removable connectors 15.

In order to improve the interchangeability of the sensors, a storage circuit 28 arranged on the circuit 12 enables setting or calibration parameters to be stored. Thus, the probes comprising sensors 25 can be calibrated in the laboratory or on a specialized site when assembly takes place and then be used easily in industrial installations without adjustment. The setting or calibration parameters can concern in particular continuous offsets, amplitude or distortion responses, attenuations according to time, lag times, or correspondence tables. When a probe is connected to a processing circuit 6, information 32 representative of the setting parameters are supplied to said processing circuit 6. Thus, for each probe comprising a storage circuit, the processing circuit 6 can correct and adapt the electronic signals representative of the light signals flowing in the fibers and representative of physical measurements. This information 32 is conveyed via the connectors 15 and 16.

Figure 4:
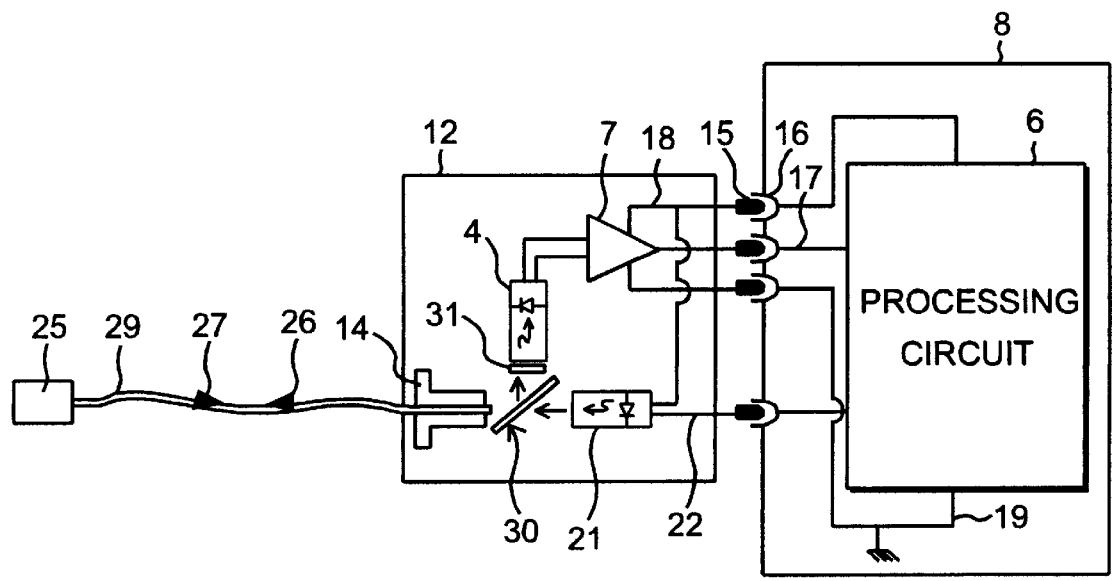
FIG. 4 shows a third diagram of optic fiber probes and devices according to a third embodiment of the invention.

FIG. 4 shows the diagram of a measuring device and a probe comprising an optic fiber 29 in which the first and second light signals 26 and 27 flow. The fiber 29 is connected to the sensor 25 via a first end and the other opposite end is secured to the circuit 12 by the securing device 14 optically linked with the light-emitting diode 21 and the photo-detector 4. A separating device 30 comprising a semi-reflecting blade is disposed between the end of the fiber 29, the diode 21 and the photo-detector 4 to separate the signals 27 coming from the fiber and from the sensor in the direction of the photo-detector 4 from the light signals 26 going from the diode to the fiber and the sensor. In other embodiments, the separating device can be a fiber power divider.

To improve the quality of separation when the signals 27 and 26 have different wavelengths, an optic filter 31 is placed in front of the photo-detector 4. The optic filter lets the signal 27 having a first wavelength pass and disables the signal 26 having a second wavelength. On this probe, the circuit 12 comprises the removable connector 15 which conveys the power supply line 18 and reference line 19 and the measurement signal 17 and the control signal 22 of the diode 21.

Figure 5:
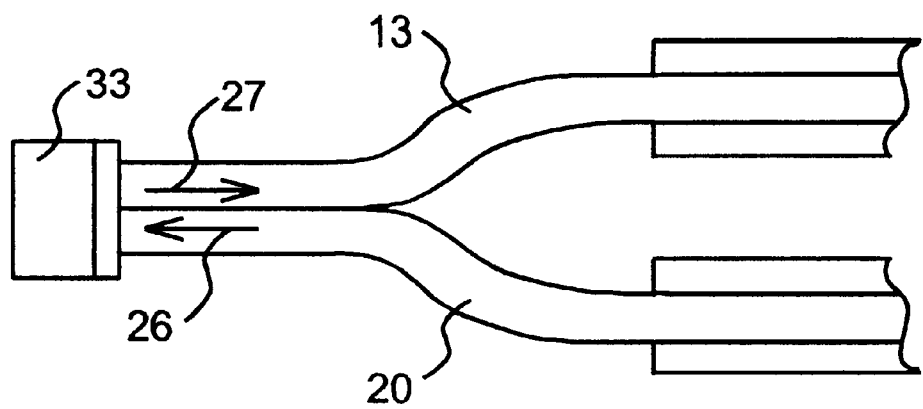
FIG. 5 shows a sensor able to be associated to a probe according to embodiments of the invention.

A sensor able to be used in probes according to the invention is represented in FIG. 5. This sensor comprises a material 33 which reacts to the light of the first signal 26 it receives. Then, or at the same time, the second light signal 27 is transmitted by said material 33. The second light signal is representative of a physical quantity to be measured. Notably, in a particular embodiment, this physical quantity is a temperature.

If the material 33 is a fluorescent or light-emitting material, the second signal has a different wavelength from the wavelength of the first signal. In addition, the light intensity of the second signal decreases in almost exponential manner versus time when the first signal stops illuminating the material 33. When the material 33 is notably ruby or alexandrite in powder form, a decrease 34 of the second signal is representative of the temperature of said material.

Figure 6A:
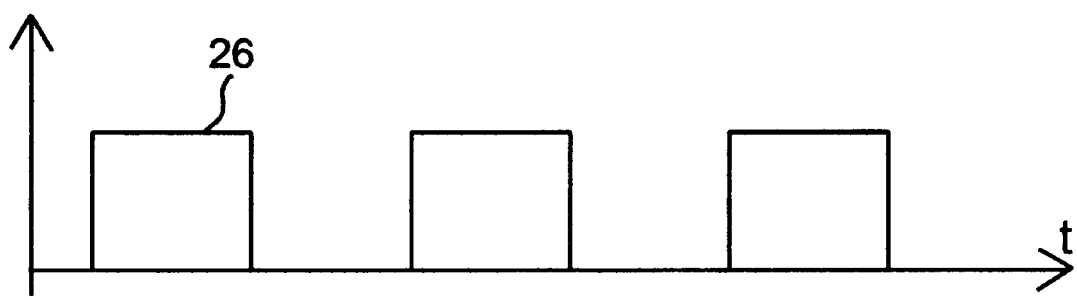
FIGS. 6a and 6b show signals able to flow in optic fibers of probes according to embodiments of the invention.
Figure 6B:
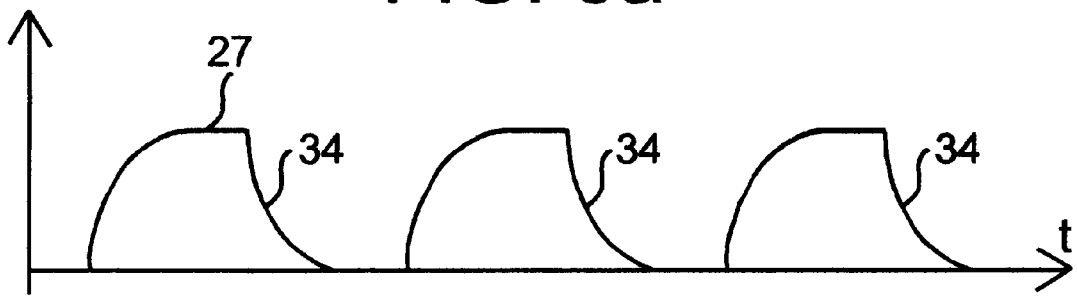

FIG. 6a illustrates the light amplitude of a first signal 26 illuminating the material 33 and FIG. 6b illustrates a second signal 27 emitted by said material 33. The processing circuit 6 determines the value of the temperature at which the material 33 is, according to the decrease 34 of the signal 27, converted into an electronic signal 17.

Figure 7:
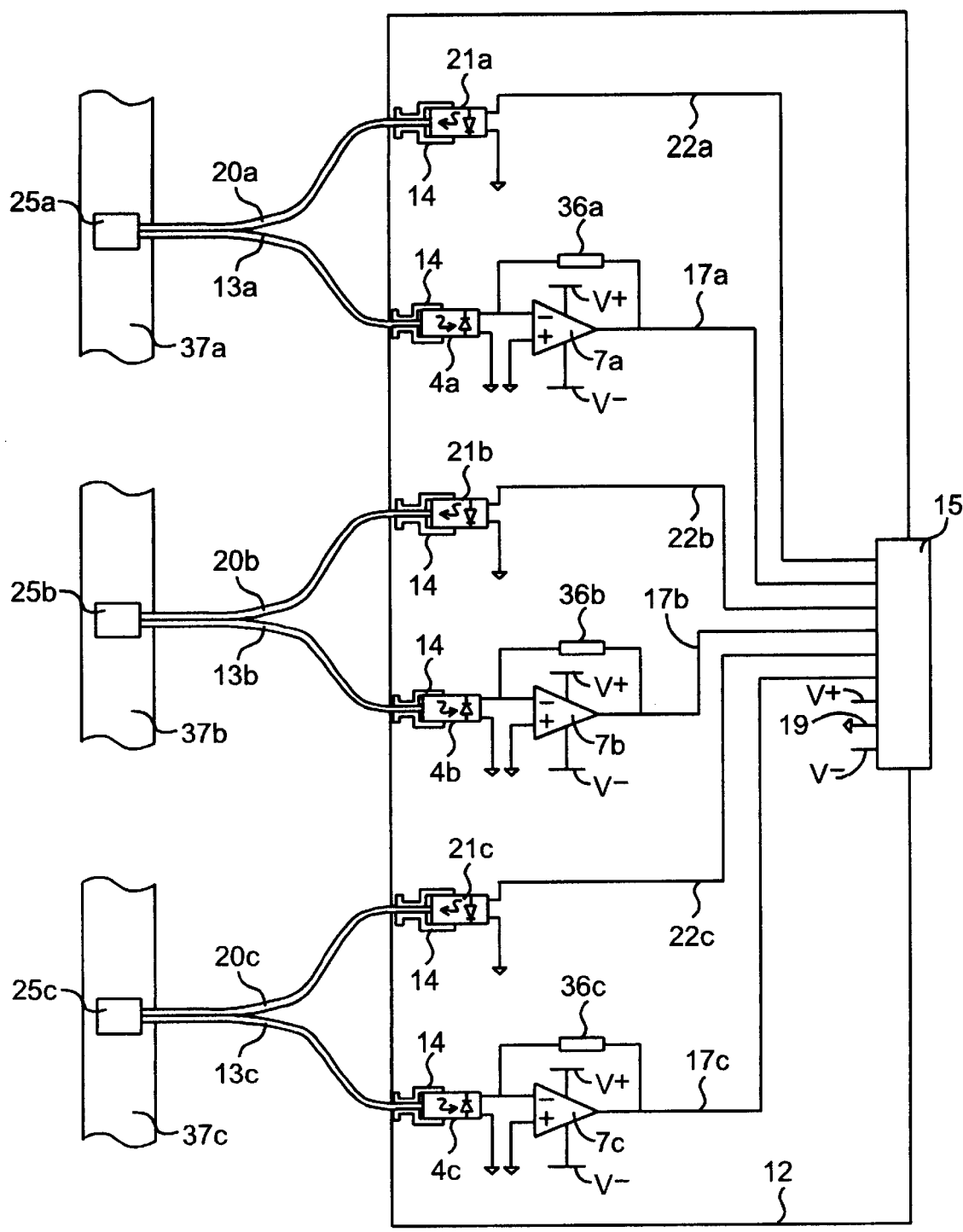
FIG. 7 shows a diagram of a probe according to an embodiment of the invention with three measurement channels.

FIG. 7 shows the diagram of an optic fiber probe for three measuring channels. The measuring channels comprising first optic fibers 20a, 20b, 20c optically connect sensors 25a, 25b, 25c to light-emitting diodes 21a, 21b, 21c and second optic fibers 13a, 13b, 13c connect the sensors 25a, 25b, 25c to photo-detectors represented by photodiodes 4a, 4b, 4c.

The six optic fibers 20a, 20b, 20c, 13a, 13b and 13c are secured to the circuit 12 by securing devices 14. The three light-emitting diodes 21a, 21b, 21c are connected to the removable electrical connector 15 to receive control signals respectively 22a, 22b and 22c. The photodiodes 4a, 4b, 4c optically linked with the second fibers respectively 13a, 13b, 13c are connected to amplifiers respectively 7a, 7b, 7c.

The amplification of each amplifier are determined by resistors 36a, 36b, 36c connected between the output and the inverted input of each amplifier respectively 7a, 7b, 7c. The amplifier outputs are connected to the connector 15 to supply measurement signals 17a, 17b, 17c, representative of the measurements made by each sensor respectively 25a, 25b, 25c. The connector 15 also supplies a reference line 19 and two power supply lines V+ and V− for power supply of the amplifiers.

In the embodiment of FIG. 7, the sensors 25a, 25b, 25c are notably temperature sensors operating for example like a sensor of FIG. 5 with a fluorescent or light-emitting material. The probe of FIG. 7 is advantageously used for measuring the temperature of an electrical installation comprising conductors 37a, 37b, 37c. Optic fibers having a high dielectric strength, probes according to FIG. 7 can be used in installations having high electrical voltages, notably low voltages, medium voltages or high voltages.

Figure 8:
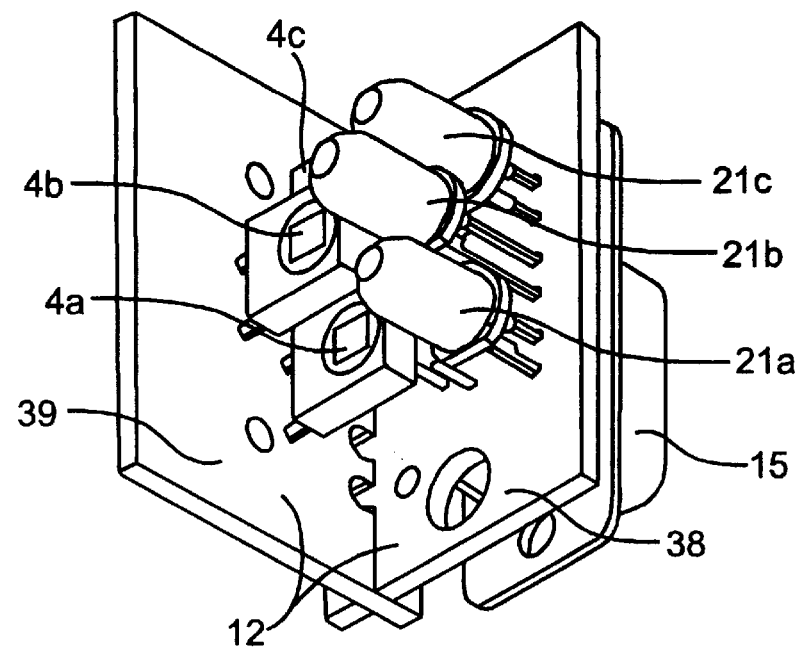
FIG. 8 shows a diagram of a probe according to the diagram of FIG. 7 with three measurement channels.

FIG. 8 shows a part of a three-channel probe according to FIG. 7. In this embodiment, the circuit 12 comprises two printed circuits 38 and 39 arranged in appreciably orthogonal manner. A first printed circuit 38 comprises the light-emitting diodes 21a, 21b, 21c and the connector 15 and a second printed circuit 39 comprises the photo-detectors 4a, 4b, 4c with the amplifiers 7a, 7b, 7c. The two printed circuits are mechanically and electrically connected. This arrangement advantageously reduces the volume of the probe and also reduces the connection surface with the measuring device.

Figure 9:
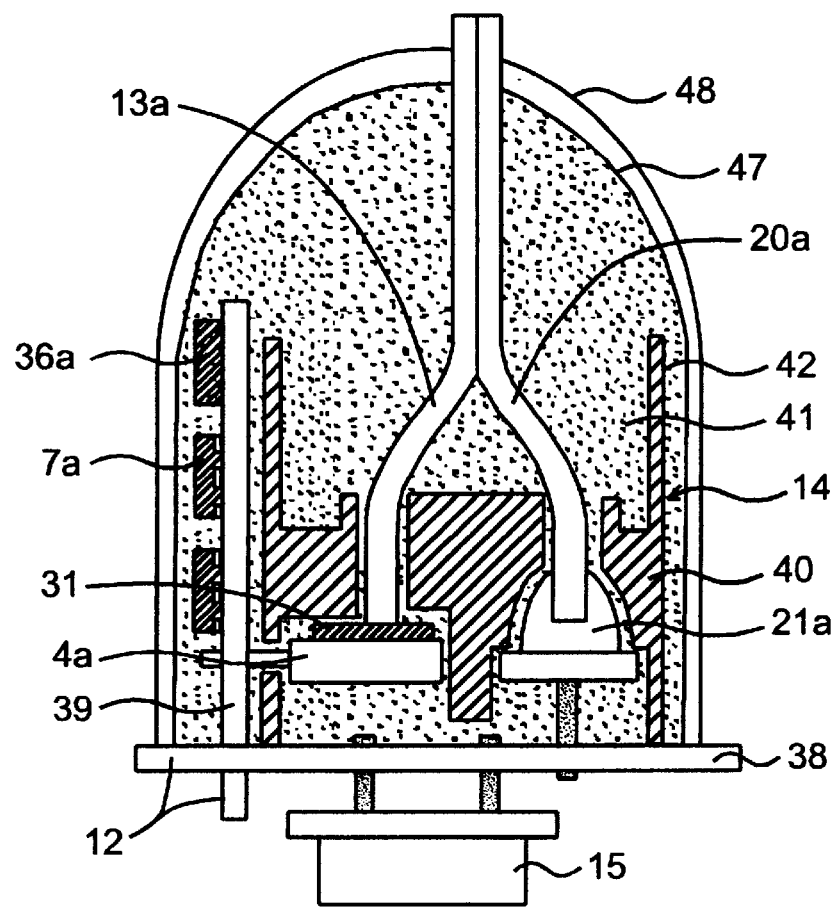
FIG. 9 shows a side view of a probe according to an embodiment of the invention.

A side view of a probe according to FIG. 8 is represented in FIG. 9. In this embodiment, the first optic fibers 20a, 20b, 20c are placed in an orifice provided on the light-emitting diodes 21a, 21b, 21c. FIG. 9 shows a fiber 20a inserted in a diode 21a. The second fibers 13a, 13b, 13c are placed in optic connection with the photo-detectors respectively 4a, 4b, 4c. Thus the fiber 13a is placed facing the photo-detector 4a. To improve the operation, an optic filter 31 disposed between the second fiber 13a and the photo-detector 4a filters light signals in order to let the signals emitted by the sensor pass and to stop the signals generated by the light-emitting diodes.

In the embodiment of FIG. 9, the optic fiber securing device 14 comprises a part 40 for fixing and positioning of the optic fibers. The optic fibers can also be stuck onto the part 40 by casting of a material 41 in a recess 42 of said part 40 receiving the fibers.

Figure 10:
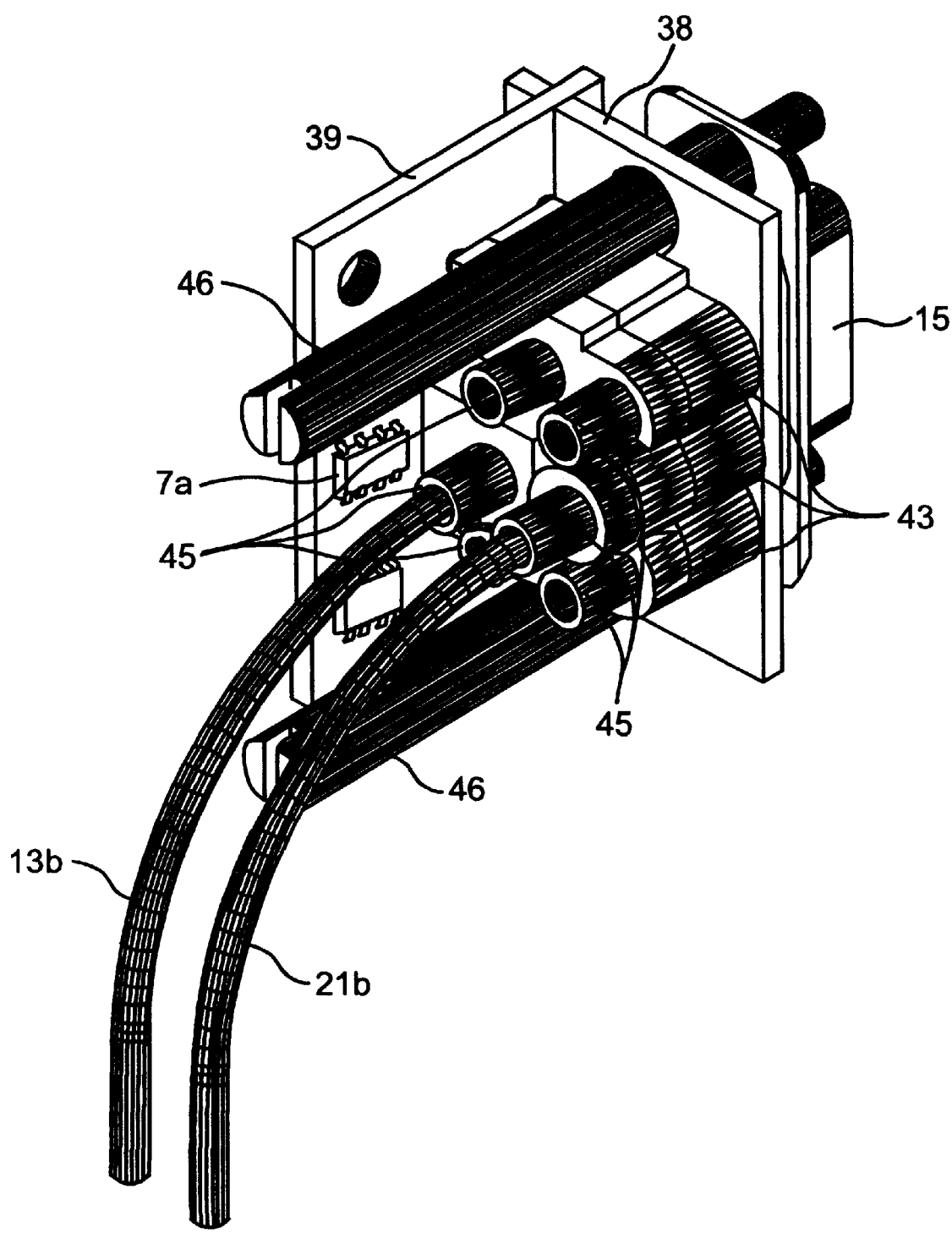
FIG. 10 shows a view of a probe according to FIG. 7 comprising improved securing means.

In the embodiment of FIG. 10, a securing device 14 comprises a base part 43 and optic fiber guiding elements 45.

Advantageously, according to a different embodiment, a probe comprises a first insulating coating 47 covering electronic components of the circuit 12 and a second conducting coating 48 covering the first insulating coating. The second conducting coating has the function of an electromagnetic shielding. Preferably, the materials constituting the coatings are polymers.

For fixing of the optic fiber probes onto the devices 8, the circuits 12 or connectors 15 comprise securing devices 46 to fix the removable connectors 15 onto fixed connectors 16.

In other embodiments, the electrical circuit 12 can be a hardwired circuit, an impregnated circuit or, for example, a circuit for fitting surface-mounted components.

What is claimed is:

1. An optic fiber measurement probe comprising:

at least one optic fiber, at least one removable electronic circuit comprising having first removable electrical connection means, at least one temperature sensor arranged at one end of at least one optic fiber, signal conversion means connected to the first removable connection means and designed to provide an interface between light signals conveyed by at least one optic fiber arranged with the temperature sensor and electronic signals designed to flow in said first removable connection means, and optic fiber securing means to keep said at least one optic fiber, arranged with the temperature sensor, in optic connection with said conversion means.

2. The probe according to claim 1, wherein the removable electronic circuit comprises amplifier means connected between signal conversion means and the first connection means.

3. The probe according to claim 1, comprising a sensor arranged on said at least one optic fiber and reacting to light signals, light signals originating from said sensor being representative of a physical quantity to be measured.

4. The probe according to claim 1, wherein the removable electronic circuit comprises storage means to store in memory calibration or setting parameters concerning the temperature sensor.

5. The probe according to claim 1, wherein the signal conversion means comprise at least one photo-detector converting light signals representative of temperature value supplied at one end of an optic fiber into electronic signals.

6. The probe according to claim 1, wherein the signal conversion means comprise at least one optic transmitter to convert electronic signals originating from the first electrical connection means into light signals input at one end of an optic fiber maintained in optic connection with said optic transmitter, said light signals being designated to excite the temperature sensor.

7. The probe according to claim 1, wherein said temperature sensor arranged at one end of at least one optic fiber comprises a light-emitting material, a first light signal being sent from conversion means to excite said light-emitting material and a second light signal being transmitted by said material and conveyed via said optic fiber to the signal conversion means, said second light signal having a different wavelength from the wavelength of the first light signal and a decrease representative of a temperature.

8. The probe according to claim 7, comprising a first and second optic fibers arranged between the sensor and the signal conversion means, the first optic fiber conducting the first light signal and the second optic fiber conducting the second light signal.

9. The probe according to claim 1, wherein the removable electronic circuit comprises an optic separation system arranged between the optic fiber and the signal conversion means.

10. The probe according to claim 1, wherein the removable electronic circuit comprises an optic filter arranged between one end of an optic fiber and the signal conversion means.

11. The probe according to claim 1, wherein said at least one optic fiber is an optic fiber made of plastic material.

12. The probe according to claim 1, wherein the optic fiber securing means comprise a positioning part for positioning an optic fiber on the signal conversion means.

13. The probe according to claim 1, wherein the optic fiber securing means comprise a guiding element.

14. The probe according to claim 1, wherein the removable electronic circuit comprises conversion means comprising at least one light-emitting diode, a photodetector and fixing means to secure a first optic fiber in optic connection with said light-emitting diode and a second optic fiber in optic connection with said photo-detector.

15. The probe according to claim 13, comprising fixing means to secure three first optic fibers in optic connection with three light-emitting diodes and three second optic fibers in optic connection with three photo-detectors.

16. The probe according to claim 14, wherein the light-emitting diodes and the first connection means are arranged on a first printed circuit of said removable electronic circuit and the photo-detectors are arranged on a second printed circuit of said removable electronic circuit, the second printed circuit being electrically connected to the first printed circuit and positioned appreciably orthogonally.

17. The probe according to claim 1, comprising a first insulating coating covering at least a part of the removable electronic circuit and a second conducting coating covering at least a part of the first coating.

18. The probe according to claim 1, used for measuring the temperature of at least one electrical conductor.

19. An optic fiber measuring device comprising signal processing means, comprising at least one probe according to claim 1, and second fixed connection means connected to said processing means and designed to cooperate with the first removable connection means.

20. An installation comprising at least one electrical conductor, wherein it comprises at least one probe according to claim 1 for measuring a temperature of said at least one electrical conductor.

* * * * *